Nov. 21, 1944.   H. W. ALDEN   2,362,978
STEERING DRIVE AXLE
Original Filed April 22, 1940

Inventor
Herbert W. Alden
By Strauch & Hoffman
Attorneys

Patented Nov. 21, 1944

2,362,978

UNITED STATES PATENT OFFICE 2,362,978

STEERING DRIVE AXLE

Herbert W. Alden, Detroit, Mich., assignor to The Timken-Detroit Axle Company, Detroit, Mich., a corporation of Ohio Original application April 22, 1940, Serial No. 331,017. Divided and this application February 6, 1942, Serial No. 429,828

11 Claims. (Cl. 180—43)

The present invention relates to drive axles for vehicles and the like, more particularly to drive axles, known in the art as steering drive axles, having dirigible wheels for steering purposes. However, certain phases of the invention are not limited to such use, and may be advantageously employed in other types of axles.

In my prior Patent No. 2,075,564, granted March 30, 1937, I have shown a steering drive axle embodying a spindle mounted for steering movements on a stationary axle housing, and the hub is supported in bearings within the spindle in a manner to facilitate assembly and disassembly.

The axle disclosed in said Patent 2,075,564 had certain substantial advantages over the prior art, but the freely axially movable connection between the wheel hub and stub shaft, provided to permit bearing adjustment, are difficult and relatively expensive to fit accurately. Also, in practical operation, stresses developed by the constant driving and braking torque reversals take up the lost motion, due to slight inaccuracies caused by wear. This lost motion increases progressively in service, and the stresses and shocks of the torque reversals progressively increase, and together with the wear due to relative axial sliding of the parts, the spline connection wears out first in the assembly. The life of these parts can be prolonged to some extent by providing relatively large parts, but this increases the weight and cost of the construction.

Accordingly, a major object of my invention is to improve the axle construction shown in said prior patent without sacrificing the improvements and advantages of the inventions disclosed in said patent.

A further important object is to provide a novel wheel hub and stub shaft assembly having improved means for adjusting the bearings without removing the hub assembly from the spindle, or dismantling the axle.

A further object is to provide a tightly fitting non-wearing splined connection between the stub shaft and the hub, and means for adjusting the bearings without disturbing the splined connection.

Further objects will become apparent as the specification proceeds in conjunction with the annexed drawing, and from the appended claims. This application is a division of my co-pending application Serial No. 331,017, filed April 22, 1940, now abandoned, for "Steering drive axle."

Figure 1:
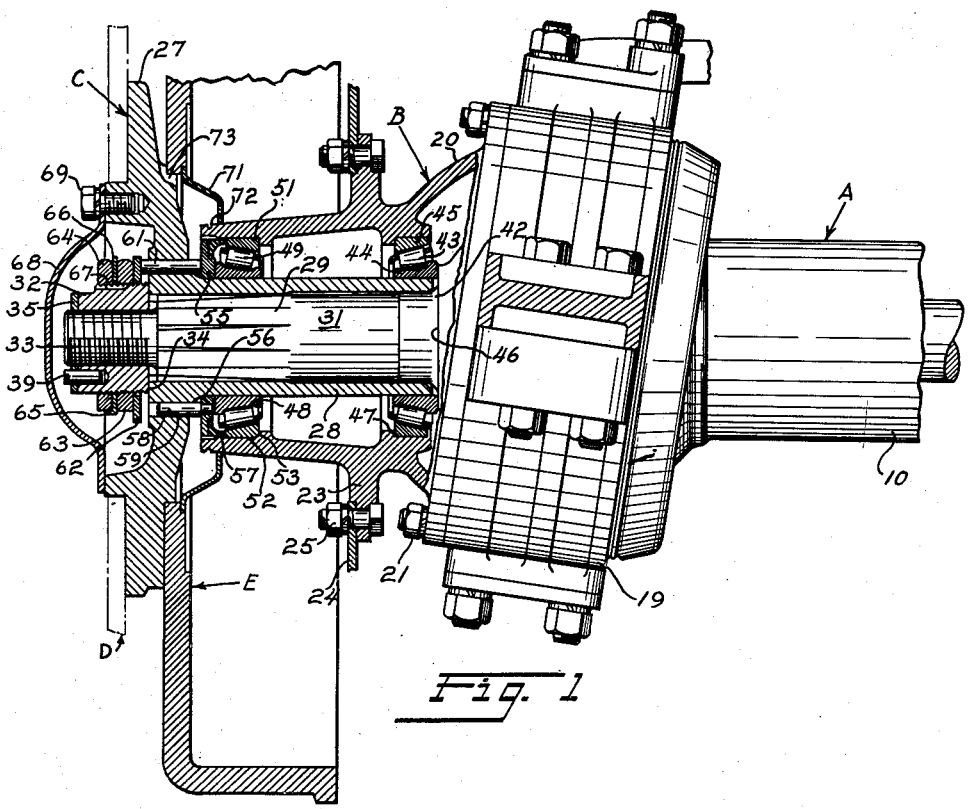
Figure 1 is a vertical longitudinal section of an axle construction embodying my invention, with certain parts in elevation, to simplify the showing.

With continued reference to the drawing, wherein like reference characters have been employed to designate like parts throughout the several views thereof, the axle construction in general comprises a main or stationary supporting housing A upon which is swivelled a movable housing, or spindle member B. A hub assembly C is rotatably journalled within the spindle and carries a wheel D and a brake drum E.

The stationary housing is made up of an inner load carrying tube 10, which is carried by the front vehicle springs in any well-known manner, and contains a drive axle driven from the central section, equipped with the usual propeller shaft and differential mechanism (not shown).

Spindle B is made up of a split cylindrical section 19, and a generally cup-shaped section 20, secured together by studs and nuts 21. A brake shoe supporting plate 24 is secured to a flange 23 on section 20 by bolts 25. Housing 10 is disposed in nesting relationship within cup portion 20 as shown in my aforementioned patent. The spindle is swivelled for oscillating movement, preferably about an inclined axis, by means of the improved journal construction disclosed and claimed in my co-pending application Serial No. 429,829, filed February 6, 1942, Patent No. 2,333,911, November 9, 1943, for "Steering drive axle," and will not be further described.

The novel hub assembly and means for adjusting it, which constitute the most important features of the invention, will now be described.

Hub C is provided with a radial flange 27, to which wheel D and brake drum E are detachably secured in well known manner by bolt and nut assemblies (not shown). Hub C is also provided with an axially directed sleeve portion 28, which is provided with internal tapered splines tightly fitting with tapered splines 29 provided on a stub shaft 31. The hub and shaft are pulled into intimate engagement by means of a nut 32 threaded on a reduced portion 33 of the stub shaft, and engaging a radial face 34 on the hub. Nut 32 is locked in place by means of a lockwasher 35, which is provided with a plurality of holes 36, and a lug or key 37, asymmetrically located with respect to the holes. Key 37 fits in a keyway 38 provided in reduced portion 33. A pin 39 seats in a bore in the nut and extends through one of the holes 36 of washer 35.

Pin 39, accordingly, prevents relative rotation between the washer when in place on the nut. Although only six holes 36 are provided, due to the location of key 37 the washer may be reversed and six additional adjusted positions obtained. Washer 35 may be held in place by a cotter pin 41. The hub and shaft accordingly constitute a rigid, unitary hub assembly.

The inner end of shaft 31 is provided with a ball portion 42 which contains the parts of a constant velocity universal joint of well-known construction, for instance, as shown in Patent No. 2,075,563. The universal joint is secured, as shown in said patent, to the splined end of the drive shaft, against relative axial or rotative movement. The driving connection between the shafts accordingly may be maintained irrespective of the steering position of spindle B with respect to the stationary housing.

The inner end of hub portion 28 is journalled in an anti-friction bearing 43 of the well-known tapered roller type, which is capable of sustaining both radial and axial loads, and it has an inner race 44 and an outer race 45. Inner race 44 bears against a shoulder 46 provided on shaft 31, and outer race 45 bears against a shoulder 47 provided within the spindle. Shaft 31 and hub 27 are therefore journalled in bearing 43 and cannot move to the left with respect to the spindle by reason of the inner and outer races bearing against the shoulders 46 and 47.

Also mounted on the smooth cylindrical outer surface of the hub is the inner race 48 of a tapered roller bearing 49. The outer race 51 is mounted in a smooth bore 52, and abuts a shoulder 53 formed inside the spindle.

Although I preferably support both ends of hub sleeve 28 in bearings, as it provides an extremely rugged construction, it is to be understood that if desired sleeve 28 may terminate short of inner bearing 43, as shown in my aforementioned patent, and yet all of the advantages of my novel bearing adjustment fully realized.

Heretofore, it was absolutely necessary to provide axial play between the hub and the shaft, in order to achieve adjustment of the bearings. By reason of the novel construction that will now be described, I am able to rigidly join the hub and shaft as a unitary assembly, and yet readily effect adjustment of the bearings externally of the hub and spindle.

Mounted for sliding axial movement on the hub is a ring 55 having a chamfered inner surface 56, and accurately ground oppositely facing radial surfaces. Bonded in a recess in ring 55, preferably by an adhesively bonding process, is a synthetic rubber seal member 57, which sealingly cooperates with outer race 51 of bearing 49. The seal prevents escape of bearing lubricant from the spindle, and since it is disclosed and claimed in the co-pending application of Lawrence R. Buckendale, Serial No. 433,512, filed March 5, 1942, it will not be further described.

Ring 55 is coupled to the hub by means of a pin 58, which is rigidly secured to the ring and slidably mounted in a recess 59 in the hub.

Ring 55 is accordingly mounted for relative axial movement on the hub and its inner surface abuts inner race 48 of bearing 49, so that by restraining outward movement of ring 55 the bearing may be similarly restrained.

Figure 2:
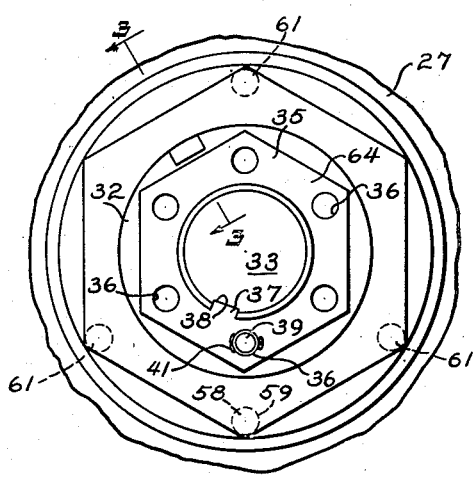
Figure 2 is a fragmental elevational view illustrating the parts of Figure 1 as they appear when viewed from the left-hand end of that figure, with the hub cap removed.
Figure 3:
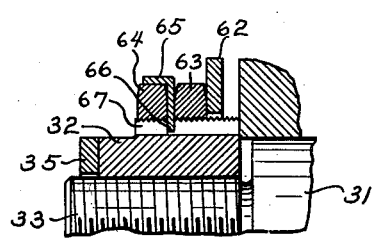
Figure 3 is a fragmental sectional view taken substantially on the line 3—3 of Figure 2.

I preferably employ three pins 61 of exactly equal length, slidably mounted in bores in the hub for controlling ring 55. Pins 61 directly engage ring 55 and at their outer ends are engaged by an accurately surfaced thrust washer 62, which is backed up by a pair of lock nuts 63 and 64 and a lock washer 65. As seen in Figures 1 and 2, lock nuts 63 and 64 are threaded on a cylindrical portion of nut 32, and lock washer 65 is provided with an integral lug 66 which fits in a keyway 67 formed in nut 32. As seen in Figure 3, the outer edge of lock washer 65 is bent over the flat portions of the nuts to lock them thereto. The nut assembly is enclosed by a hub cap 68 of any desired form, secured in place on the hub by means of cap screws 69.

From the foregoing it is apparent that the hub and stub shaft may be rigidly secured together to form a unitary hub, and yet the proper bearing adjustment may be readily made externally of the hub and spindle by removing cap 68 and adjusting nuts 63 and 64. For instance, assuming that the bearings are to be taken up to compensate for wear, lock nut 64 is loosened and nut 63 is threaded further onto nut 32, so as to move pins 61 to the right in Figure 1 and communicate corresponding movement to ring 55 and inner race 48 of bearing 49. Movement of race 48, as just described, takes up the play in both bearings 49 and 43 in well-known manner. Lock nut 64 is then tightened and the hub cap replaced.

As pins 61 are three in number and are of exactly the same length, ring 55 is actuated by forces exerted at three equidistant points, and may be regarded as supported in an axial direction on a stable three point support. Since the only function of pin 58 is to transmit rotative efforts to ring 55, only one pin is used, and it is interposed between two of the pins 61.

The advantages of the novel assembly just described are many. In the first place, since the hub and shaft are rigidly joined, they form a rigid unitary assembly of great strength, and since no relative movement takes place between the parts no wear occurs. Also, the tapered splines need not be so accurately formed as when sliding action must take place between the parts. Moreover, since no lost motion exists between the parts, and hence no impact forces are allowed to develop between them, both the hub and shaft may be of smaller size than if a sliding joint were used. I have also found that by rigidly joining sleeve portion 28 and shaft 31 they mutually reinforce each other against flexing in response to loads placed upon them in operation.

Although I have shown a tapered spline connection between the shaft and the hub, it is to be understood that any other suitable rigid connection may be used without departing from the spirit of the invention. For instance, a plain tapered surface and key, similar to that used in rear axles, may be used. I preferably thread lock nuts 63 and 64 on the exterior of nut 32, as it provides a simple, reliable assembly, but it is to be understood that they might be threaded upon some other part of the device without departing from the spirit of the invention. For instance, nuts 63 and 64 might be provided with external threads, and threaded into an internally threaded portion of the hub.

I have also shown a novel lubricant diverting assembly associated with the outer end of the spindle. In order to prevent any lubricant which may escape past seal 57 from getting onto the brake drum, a cup-shaped lubricant collecting ring 71 is secured to the inner face of brake drum E and extends into close proximity to the outer surface of the spindle. In order to prevent lubricant from creeping along the outer surface of the spindle, and possibly finding its way outside member 71, I provide an external groove 72 adjacent the end of the spindle. Any lubricant collected in member 71 is conducted through a plurality of passages 73 formed in the wheel hub to the exterior. In this way contamination of braking surfaces with lubricant is avoided.

With the parts assembled as shown in Figure 1, the axle construction is disassembled as follows:

Hub cap 68 is removed, and lock nuts 63 and 64 are threaded off of nut 32. Thrust washer 62 and pins 61 may then be readily withdrawn. Lock washer 35 is then removed and nut 32 unscrewed. A wheel puller is then employed to pull the hub off of shaft 31. Seal ring 55, inner bearing race 48, and bearing 49 usually come off with the hub, so this leaves merely outer race 51 in place in the spindle. Housing section 20 is then separated from split section 19 by removing nuts 21, and upon separation of the two sections of housing 19, the axle is completely disassembled.

My novel axle construction may accordingly be readily disassembled in a simple operation. However, it is to be understood that the novel hub assembly and bearing adjustment may be advantageously utilized in axle constructions having a one-piece spindle assembly of the character shown in my aforementioned patent, and as shown in Figure 1 of the parent application, and the appended claims accordingly embrace my novel hub and bearing assembly irrespective of the specific type spindle with which it is incorporated.

From the foregoing description, it is apparent that the novel axle construction of the invention embodies a rigid unitary hub assembly of great strength journalled within the spindle, and novel means is provided for adjusting the bearings, and which does not require the hub to be moved relatively to the spindle, or the axle construction to be dismantled.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle, a housing; a shaft disposed in said housing and having a threaded outer end; a flanged member sleeved over said shaft and having tapered internal surfaces engaging correspondingly tapered surfaces on said shaft; a nut threaded on said shaft and maintaining said member and shaft in rigidly joined relationship; a pair of axially spaced anti-friction bearings journalling said member and shaft for rotation within said housing; means projecting through said flanged member for limiting axial movement of one of said bearings; and means threaded on the outside of said nut for controlling said last-named means.

2. In a drive axle, a housing; a hub having a wheel supporting flange and an axially directed sleeve; a shaft; means rigidly securing said shaft to the sleeve portion of said hub, to form a unitary hub assembly; a pair of axially spaced radial and axial load anti-friction bearings journalling said hub assembly for rotation in said housing, one of said bearings having a race mounted for axial movement on the sleeve portion of said hub; a plurality of circumferentially spaced pressure applying means extending through said flange for limiting movement of said race in one direction; and common means for controlling said last-named means and operable to simultaneously displace the same by equal increments.

3. In a drive axle, a housing; a hub having a wheel supporting flange and an axially directed sleeve; a shaft; a nut rigidly securing said shaft to the sleeve portion of said hub, to form a unitary hub assembly; a pair of axially spaced radial and axial load anti-friction bearings journalling said assembly for rotation in said housing, one of said bearings having a race adapted for axial movement on the sleeve portion of said hub; means, comprising a plurality of pins slidably extending through said flange, for limiting movement of said race in one direction; and means engaging the outer ends of said pins and operable to selectively maintain them in any one of a plurality of axially adjusted positions, said means being operable without disturbing the position of said nut.

4. In a drive axle, an open-ended housing; a pair of axially spaced anti-friction bearings of the combined radial and axial load type mounted in said housing; a hub member carried by the inner races of said bearings and having a flange overlying the open end of said housing; a shaft tightly fitting within said hub and having abutment means cooperating with the inner race of one of said bearings, to limit endwise movement of said hub and shaft in one direction; means for rigidly securing said shaft to said hub; and means, projecting through said hub, and operable externally thereof, for axially adjusting the inner race of the other of said bearings, and for limiting endwise movement of said shaft and hub in the opposite direction.

5. The drive axle defined in claim 4, wherein said last-named means comprises a plurality of circumferentially spaced, axially slidable pins, located outwardly of said shaft and said shaft and hub securing means; and common means for simultaneously displacing said pins by equal increments, thereby insuring displacement of the inner race of the other of said bearings without tilting or setting up any distorting tendencies therein.

6. The drive axle defined in claim 4, wherein said last-named means comprises a ring slidable on said hub and abutting the inner race of the other of said bearings; a plurality of pins of exactly equal length axially slidable in openings in the flange of said hub and abutting said ring; a threaded element cooperating with the outer ends of said pins and operable to displace the latter by equal amounts when it is rotated; and means for locking said threaded element in adjusted position.

7. In a drive axle, a drive shaft and a flanged hub having tapered, closely interfitting splines; a nut member threaded onto said shaft and engaging said hub at one side of said flange; means mounting said hub for rotation, including a bearing race slidable on said hub the other side of said flange; and means for adjusting said bearing race on said hub, comprising nut means threaded onto said nut member and a plurality of axially slidable pins in said flange coacting with said nut means.

8. The drive axle construction defined in claim 7, together with a ring slidably mounted on said hub between said bearing race and the inner ends of said pins; and means for keying said ring to said hub, for unitary rotation therewith.

9. The drive axle construction defined in claim 7, wherein said nut member comprises an outer wrench-engaging portion and an inner externally threaded portion, and said nut means comprises a thrust washer engaging the outer ends of said pins and a nut engaging the externally threaded portion of said nut member and abutting said thrust washer.

10. The drive axle defined in claim 7, wherein said nut member is externally threaded and is provided with a longitudinal keyway, and said nut means comprises a pair of nuts and a lock washer mounted on the externally threaded portion of said nut member, and said lock washer has a projection seating in said longitudinal keyway.

11. In a drive axle, an open ended housing; a hub having a flange overlying the open end of said housing and having a sleeve portion journalled in spaced anti-friction bearings in said housing, one of said bearings having an inner race slidable on said hub adjacent said flange and having an outer race secured in said housing adjacent the open end thereof; a combined seal and thrust ring slidably mounted on said hub between said one bearing and said flange and having a portion abutting said inner race and also having a seal device sealingly engaging said outer race; a plurality of axially slidable pins projecting through said flange and abutting said ring; and common means for simultaneously advancing said pins by equal increments, for shifting said inner bearing race in a direction to take up bearing play and also forcing said seal device against said outer bearing race.

HERBERT W. ALDEN.